Jan. 10, 1961  B. C. BARNES  2,967,387
CARTON SEALING MACHINE
Filed Sept. 22, 1958  4 Sheets-Sheet 1
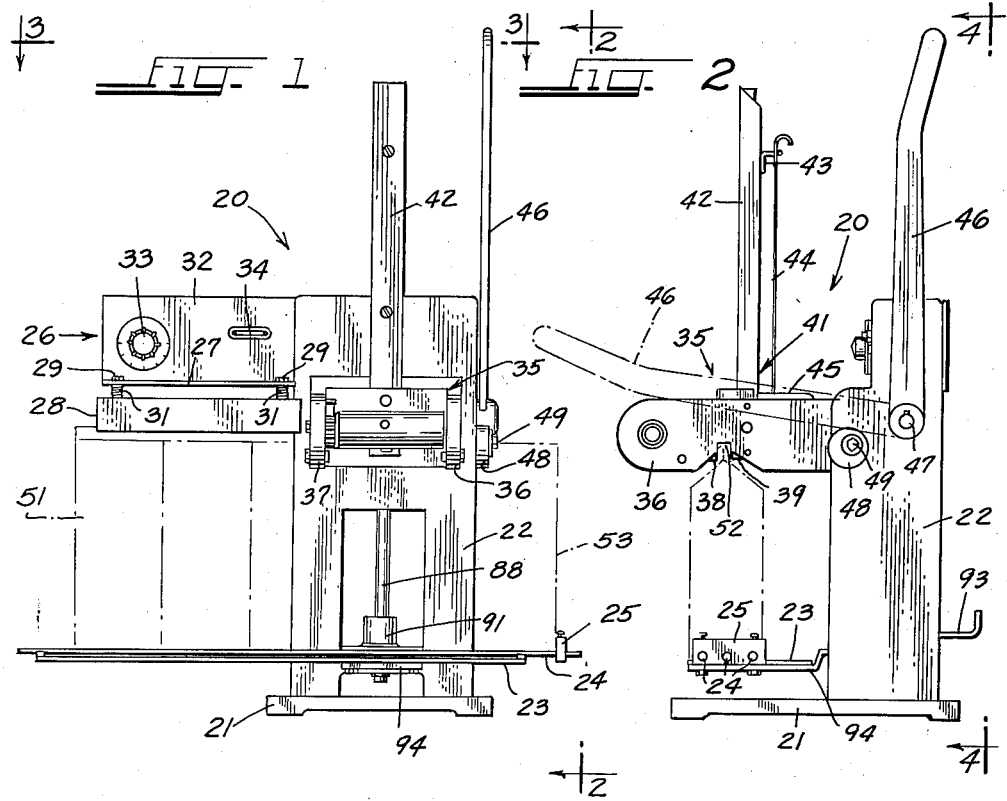
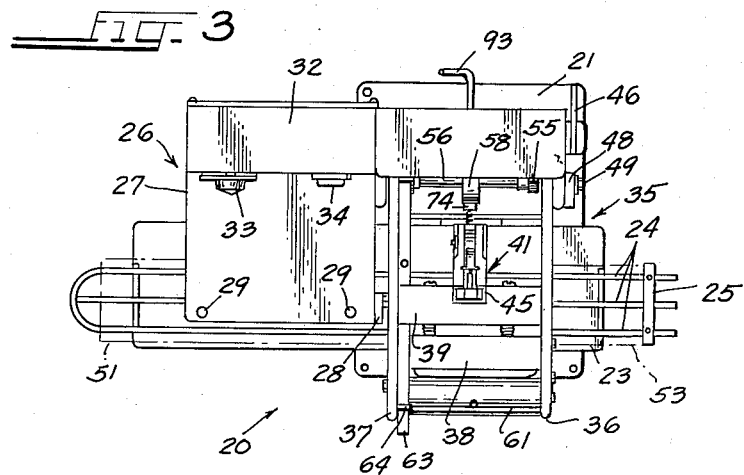
INVENTOR.
BERNARD C. BARNES
BY
Wallace and Cannon
ATT'YS.

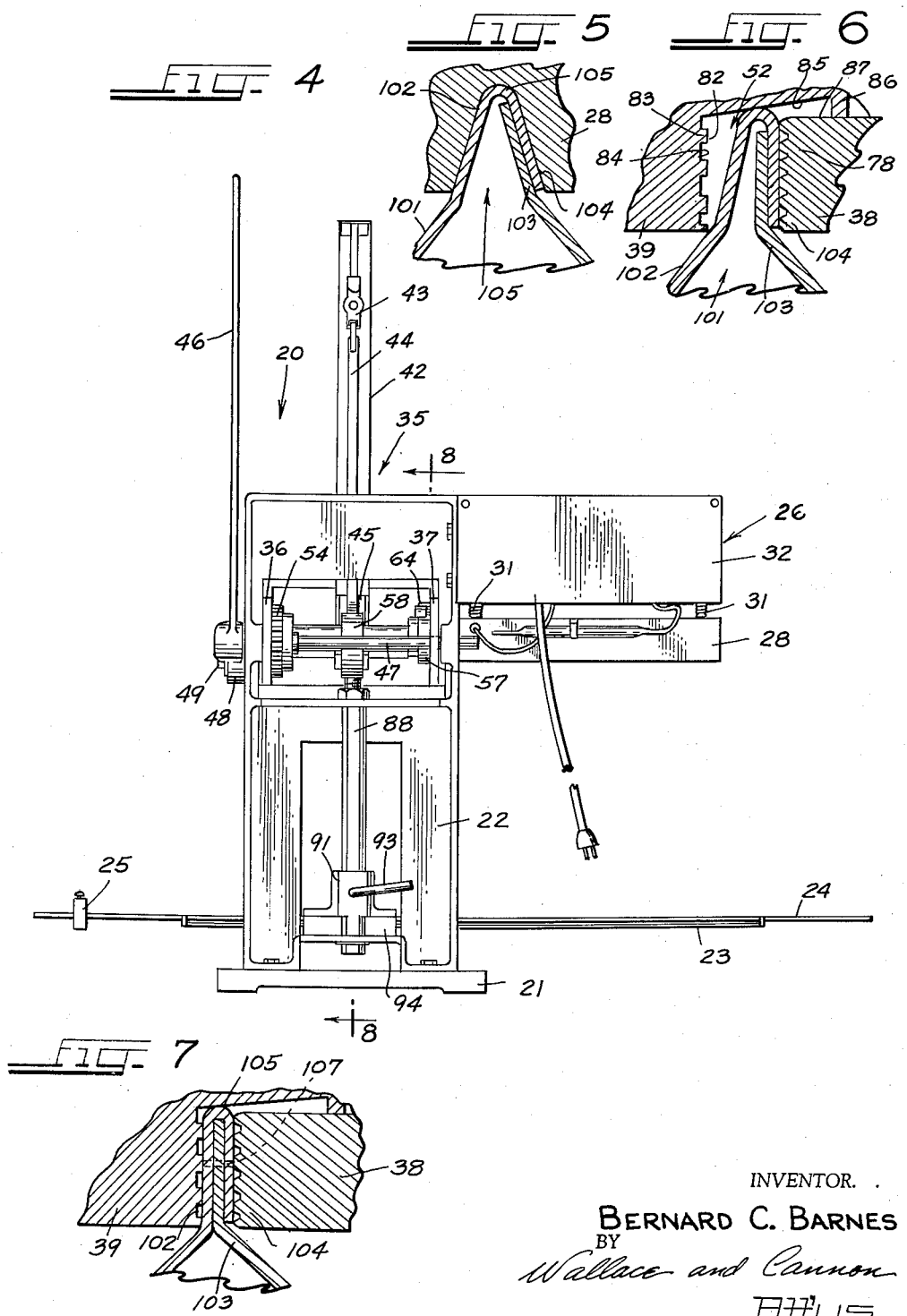

Jan. 10, 1961
B. C. BARNES
2,967,387
CARTON SEALING MACHINE
Filed Sept. 22, 1958
4 Sheets-Sheet 3
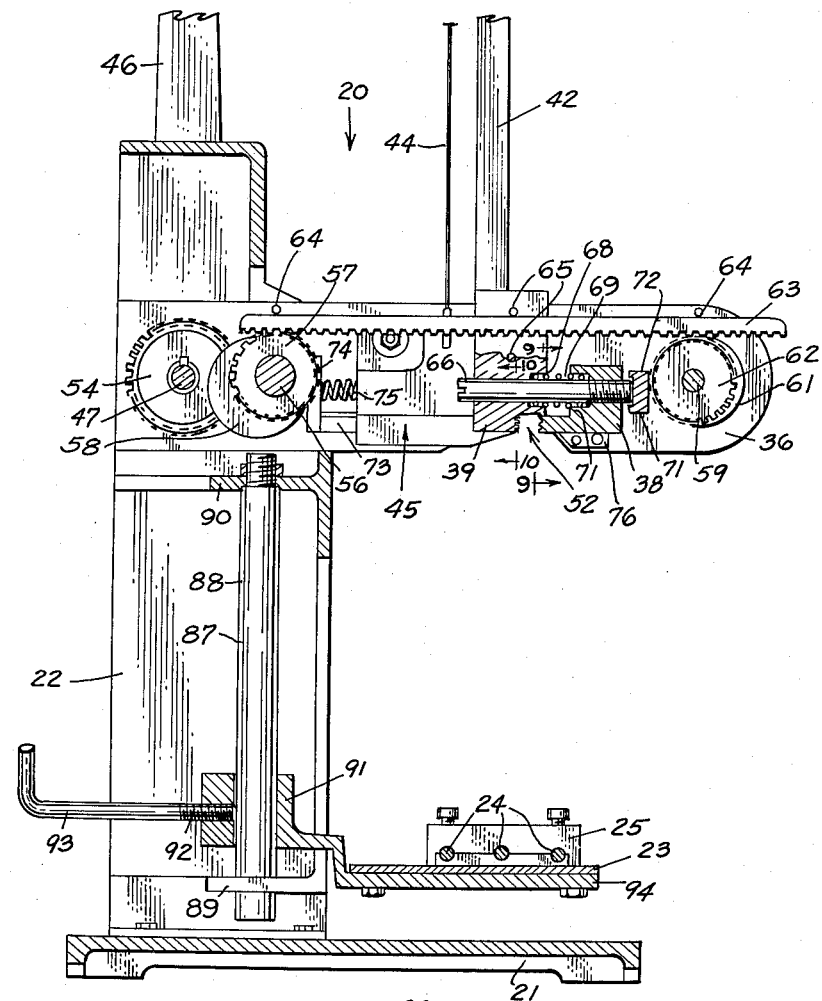
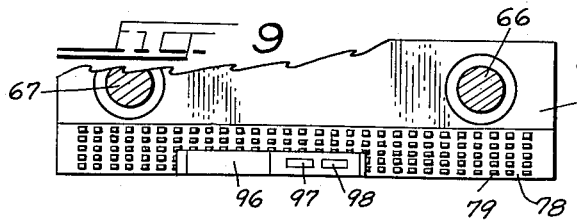
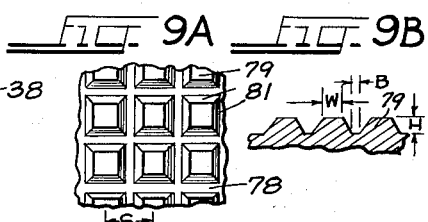
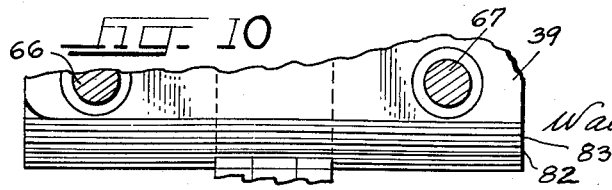
INVENTOR.
BERNARD C. BARNES
BY
Wallace and Cannon
ATTYS

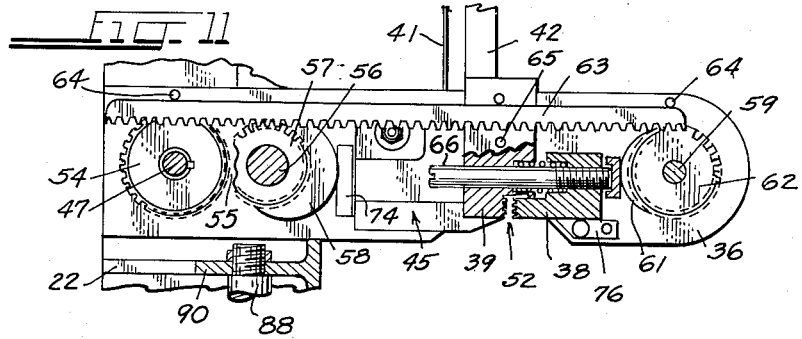
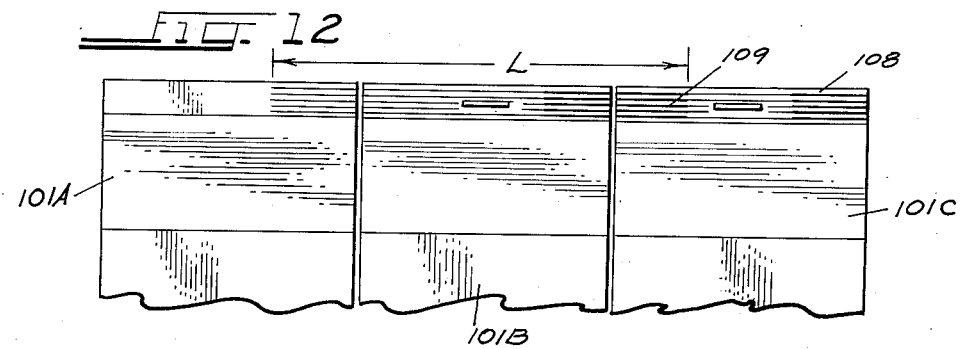
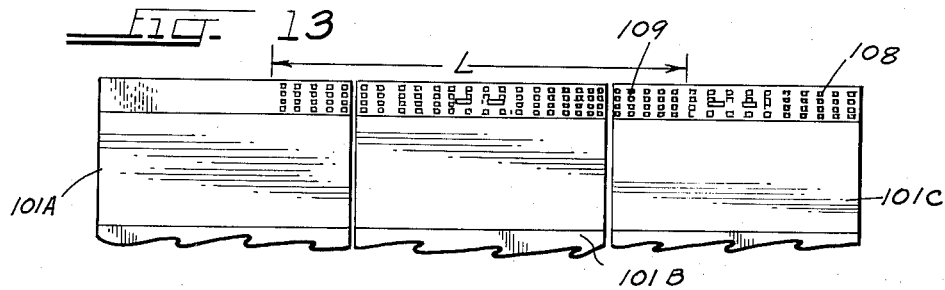
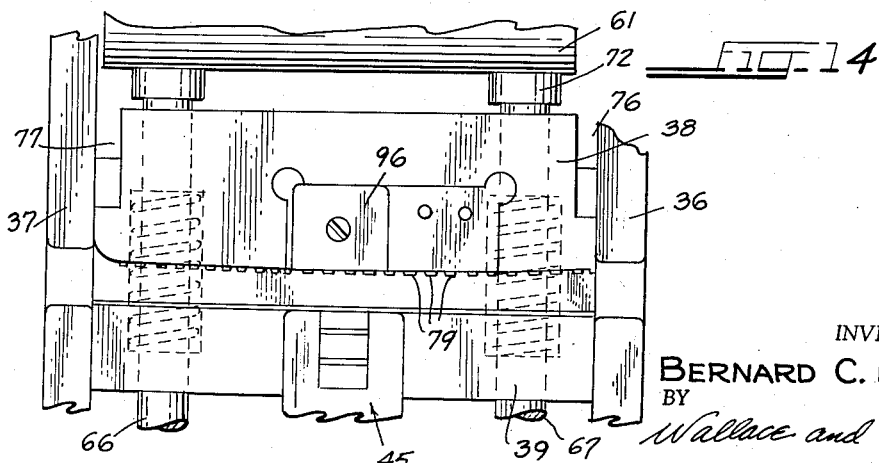

United States Patent Office 2,967,387
Patented Jan. 10, 1961

2,967,387
CARTON SEALING MACHINE
Bernard C. Barnes, 1340 Kentucky St., Racine, Wis.
Filed Sept. 22, 1958, Ser. No. 762,437
11 Claims. (Cl. 53—373)

This invention relates to a new and improved sealing machine and particularly to a sealing machine of the kind in which plural layers of material, such as especially coated paper, are sealed together under pressure. The invention is particularly advantageous as applied to the sealing of liquid-containing cartons, and will, therefore, be described in that connection.

Coated paper containers are employed in the distribution of a number of different liquid materials and particularly in the sale of milk and other dairy products and beverages. The paper containers come in a number of different sizes, generally ranging in capacity from one-half pint to one-half gallon. The containers are fabricated from coated and impregnated paper, the coating usually comprising a wax or other heat softenable material.

One of the principal problems encountered with containers of this kind relates to sealing of the cartons to prevent leakage during the course of distribution. The milk or other beverage is usually packaged at one location and subsequently delivered to a retail outlet or directly to the home of a consumer. If the package leaks, there is, of course, some loss of the milk or other beverage, with the result that the purchaser does not get the full quantity desired. Moreover, in many instances it is difficult to maintain the necessary sanitation where excess leakage is encountered.

One of the more common kinds of milk or other beverage carton is closed, after filling, by folding the top portion of the carton together. After the carton is folded together it is stapled and the several layers thereof are sealed to each other under heat and pressure. The sealing together of the interfolded layers of the top portion of the carton is supposed to prevent leakage of the contents of the container in the event that the carton is tipped or jarred during delivery to the ultimate consumer. Unfortunately, however, previously known sealing techniques have not afforded consistent enough sealing to prevent a substantial amount of leakage. Thus, leakage may be encountered in as many as fifty percent of cartons sealed by even the best of previously known sealing machines.

A primary object of the invention, therefore, is to provide for machine sealing of milk and beverage containers by means which afford a substantial improvement, insofar as leakage is concerned, in comparison with previously known sealing machines.

Another object of the invention is to seal together plural layers of materials, each having a heat softenable external surface, by means affording a sealing pattern which precludes leakage through the seal in all but a minimum number of instances of the order of two to three percent or less.

A more specific object of the invention is to provide a new and improved sealing jaw surface construction for a sealing machine which inherently and effectively produces a stronger seal than heretofore available.

Another object of the invention is to provide a new and improved manually operated sealing machine for milk and beverage cartons and the like which is simple and economical in construction, yet affords a relatively high output in the hands of an unskilled operator.

One specific problem in relation to the strength of the sealed portion of a conventional beverage carton concerns engagement of the folded edge portions of the carton in the area of sealing. During the sealing operation, the folded portions of the carton may tend to slip, with respect to each other, to a position in which, although one layer is folded over the other, the folded portion of the one layer does not uniformly engage the second layer. This condition may frequently cause leakage at the end of the folded portions of the carton.

A further object of the invention, therefore, is effectively and automatically to fold the ends of the carton together more tightly during the course of a sealing operation.

A specific object of the invention is to provide a sealing jaw structure which inherently and effectively folds the edge portions of a carton more tightly upon each other as the carton is sealed, under pressure, and stapled.

Another object of the invention is to provide a new and improved manually operated machine, actuated by a single lever, which is effective to heat the edge portions of a beverage carton, to compress the edge portions together, to staple the compressed edge portions, and, at the same time, to fold the edge portions together more tightly as an incident to the stapling and sealing operation.

Other and further objects of the present invention will be apparent from the following description and claims and are illustrated in the accompanying drawings which, by way of illustration, show a preferred embodiment of the preesnt invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

Fig. 1 is a front elevation view of a new and improved sealing and stapling machine constructed in accordance with a preferred embodiment of the invention;

Fig. 2 is a side elevation of the sealing and stapling machine of Fig. 1;

Fig. 3 is a plan view of the sealing and stapling machine;

Fig. 4 is a rear elevation view of the sealing and stapling machine;

Fig. 5 is a detail sectional view, drawn to a larger scale than the preceding figures, of a heater block included in the sealing and stapling machine;

Fig. 6 is a detail sectional view of the sealing jaws of the machine at an early stage of operation;

Fig. 7 is a detail sectional view, similar to Fig. 6, showing the sealer jaws at an advanced stage of operation;

Fig. 8 is a transverse sectional view of the sealing and stapling machine, taken approximately along line 8—8 in Fig. 4 and shows the major elements of the operating mechanism of the machine;

Fig. 9 is a detail view of one sealing jaw of the machine, taken approximately along line 9—9 in Fig. 8 but drawn to a substantially larger scale;

Fig. 9A is a substantially enlarged view of a minor portion of the sealing surface for the jaw of Fig. 9;

Fig. 9B is a sectional view taken approximately along line 9B—9B in Fig. 9A;

Fig. 10 is a detail view of the face of the other sealing jaw of the machine, taken approximately along line 10—10 in Fig. 8;

Fig. 11 is a detail sectional view of the operating mechanism of the sealing machine, similar to the corresponding portion of Fig. 8, but showing the machine in a different operating position;

Fig. 12 is an illustrative drawing of a number of beverage cartons, illustrating the effect of several cycles of machine operation;

Fig. 13 is a view similar to Fig. 12 but showing the opposite side of the same cartons; and Fig. 14 is a detail view of the bottom of the sealing jaws of the machine.

The basic organization and operation of the invention may perhaps be best understood by reference to Figs. 1–3. As indicated therein, the sealing and stapling machine 20 comprises a support structure including a base 21 and a vertical frame or housing 22 which is mounted in fixed position on the base by suitable means such as a plurality of bolts, screws, or the like (not shown). An elongated platform 23 is supported upon the frame 22 for vertical movement with respect to the frame as described more fully hereinafter in connection with Figs. 4–8. A support track 24 is mounted upon the platform 23 to support beverage containers or other similar articles as they are passed through the machine. A stop member 25 is mounted at one end of the track, this end of the track being the one from which the cartons are removed after the sealing and stapling operation has been completed. The mounting arrangement for the stop member 25 is such that the stop member may be adjusted longitudinally of the track 24 to accommodate different carton sizes.

The sealing and stapling machine 20 further includes a heater station 26 which is mounted in cantilever fashion upon the frame 22 of the machine. The heater station 26 includes a bracket 27 which is fixedly mounted upon the frame 22 by suitable means such as a plurality of bolts, screws, or the like. A heater block 28 is suspended from the bracket 26 upon a pair of studs 29. The heater block 28 is vertically movable along the studs 29 but is normally biased to the lowermost limit of its range of movement along the studs by a pair of springs 31. One or more heater elements of conventional type are mounted within the heater block 28; because these heater devices may be conventional in construction, they have not been shown in the drawings. Any electrical or other heating element may be employed in connection with the block 28 as desired.

The heater station 26 further includes an electrical control device 32 which is mounted on the rear portion of the bracket 27. The control unit 32 includes a conventional adjustable thermostat control 33 and may also include a suitable indicator light 34. Because the electrical control arrangement is not particularly critical in relation to the invention, and any relatively accurate thermostat control may be employed, the electrical circuit arrangement for this portion of the machine has not been illustrated in detail in the drawings.

Immediately adjacent the heating station 26, is a sealing and stapling station 35, in which the principal features of the invention are incorporated. The sealing and stapling station 35 comprises a pair of cantilever support arms 36 and 37 which are affixed to and extend outwardly of the frame 22 of the machine. The cantilever arms 36 and 37 support a pair of sealing jaws 38 and 39, together with a mechanism for moving those jaws toward and away from each other, as explained in detail hereinafter. In the illustrated structure, the jaw 39 is fixedly mounted upon the arms 36 and 37 and the jaw 38 is moved toward and away from the jaw 39; however, this arrangement could be reversed if so desired. As best indicated in Fig. 3, the jaws 38 and 39 are directly aligned with the heating block 28 of the heating station 26.

The cantilever arms 36 and 37 are also employed to support a stapler, generally indicated by reference numeral 41. The stapler 41 includes the usual magazine 42 with a follower 43 which moves a supply of staples down the magazine in response to the force exerted by a spring 44. The stapler further includes a stapling head 45 which is aligned with the center portion of the sealing jaws 38 and 39. The stapler 41 may be entirely conventional in construction; accordingly, only a limited portion of the stapling mechanism is illustrated in the drawings and described in this specification. A preferred form of stapler is one generally similar to that manufactured and sold by American Machine Works, Inc., of Racine, Wisconsin, under the general designation Model 11. This type of stapler is much preferred because the stapler head includes only two moving parts and is therefore much easier to keep in clean and sanitary condition than more conventional stapler heads, which may include as many as twenty moving parts or more. This is particularly important in the packaging of beverages and other commodities intended for human consumption.

Both the stapler 41 and the sealing jaws 38, 39 are operated, in the preferred embodiment of the invention, by a single operating lever 46. The lever 46 is pinned or otherwise affixed to a shaft 47 which is journalled in a suitable bearing in the right hand portion of the frame 22. The handle or operating lever 46 is movable in a counter-clockwise direction, as seen in Figure 2, the arc through which the handle may be moved being limited by a stop member 48 mounted upon a stud 49 which extends outwardly from the right hand side of the frame as seen in Fig. 1. It should be noted that the stop member 48 is eccentrically mounted upon the stud 49 to provide for adjustment of the limitation upon the movement of the operating lever 46.

In operation of the sealing and stapling machine 20, a filled container is first deposited on the left hand end of the track 24, as generally indicated by the phantom outline 51 in Figs. 1 and 3. From this position, the carton is moved toward the heater block 28, and the portion of the carton to be sealed is engaged in a slot in the heating block as fully described hereinafter in connection with Fig. 5. Subsequently, a second carton is placed on the end of the track 24 and is pushed to the right, as seen in Figs. 1 and 3, to advance the first carton through the heating block to a position in which the entire width of the carton is disposed beneath the heating block.

Subsequently, a third carton is deposited on the track 24 in the position 51 and is employed to advance both of the other cartons into the machine. This brings the first carton partially within the gap or space 52 between the two sealing jaws 38, 39 (see Fig. 2). However, the carton is not yet aligned with the stapler 41. On this cycle of the machine operation, the operating handle 46 may be manually moved in a counterclockwise direction to squeeze the leading portion of the first carton between the jaws 38 and 39 and thus initate a sealing operation. Thereafter, a fourth carton is deposited in the position 51 and is manually moved to the right (1 and 3) to advance the first three cartons into the machine. When this has been accomplished the handle 46 is moved, manually, in a counterclockwise direction. As a result, the entire width of the leading carton is compressed between the two jaws 38 and 39. At the same time, the stapler head 45 is actuated to drive a staple through the center portion of the carton to afford a mechanical bond for the carton closure.

In the next operating cycle of the machine, another carton is manually advanced into the machine and the handle 46 is again actuated to achieve a sealing and stapling operation on the next-to-last carton in the line. The trailing end of the closure portion of the first carton is still disposed between the jaws 38 and 39 and is also compressed, finishing the sealing operation on this carton.

On the next operating cycle of the machine, the leading carton is pushed along the track 24 to a point where it engages the stop 25. Thus, the leading carton limits the movement of the next carton and determines the position of the individual cartons within the machine. After the lever 46 has been actuated in this cycle of operation, the leading carton is removed from the position indicated by phantom outline 53 (Figs. 1 and 3) so that a new carton may be started on its way through the machine. Thereafter, during each cycle of operation, a carton is removed from the position 53, a new carton is placed in the position 51, and the train of cartons is shoved to the right through the machine until the lead carton engages the stop 25. At this juncture the handle 46 is actuated to effect a sealing and stapling operation. This completes a full operating cycle of the machine and readies the machine for its next operating cycle. On the average, and with even a relatively unskilled operator, each operating cycle of the machine should require no more than approximately seven seconds. Of course, it may be desirable to vary this operating time, depending upon the operator. With a shorter time it is generally necessary to raise the temperature of the heating block 28, by means of the thermostat 33, as compared to the operating temperature for a relatively longer operating cycle. In general, and assuming an operating cycle of approximately seven seconds employed in sealing standard wax coated beverage cartons, the temperature of the block 28 may be maintained at approximately two hundred degrees Fahrenheit.

The operating mechanism for the sealing and stapling station 35 of the machine is best illustrated in Figs. 4, 8 and 11. As particularly shown in Fig. 4, the shaft 47 extends across the rear portion of the frame 22 and is journalled in suitable bearings in the two sides of the frame. A pinion or drive gear 54 is mounted on the shaft 47 for rotation therewith and is located adjacent to the left hand side of the machine as seen in Fig. 4. The pinion 54 is in meshing engagement with a spur gear 55 that is affixed to a shaft 56. The shaft 56 and gear 55 are best shown in Fig. 11. Like the shaft 47, the shaft 56 extends transversely of the rear portion of the machine and preferably is journalled in suitable bearings in the two cantilever support members 36 and 37 (see Fig. 4). A second spur gear 57 is affixed to the right hand end of the shaft 56, as seen in Fig. 4 and rotates with rotation of the shaft. In addition, an eccentric of cam 58 is mounted on the shaft 56 for rotation therewith.

At the end of the support arms 36—37 opposite the frame 22, an additional shaft 59 is mounted. The shaft 59 extends between the two frame members and is journalled in suitable bearings in the frame member. An elongated cam cylinder 61 is mounted upon the shaft 59 for rotation therewith, as indicated in Figs. 3, 8 and 11. In its simplest form the cam roller 61 may comprise a cylindrical lock which is eccentrically located upon the shaft 59. In addition, a spur gear 62 is affixed to the near end of the shaft 59, as seen in Figs. 8 and 11, to be rotated by the shaft. The gear 62 is aligned with the gear 57 at the opposite end of the machine. The two gears engage and support a rack 63 which extends through the machine from front to back, approximately parallel to and closely adjacent to the frame member 37 (see Fig. 3). A plurality of pins 64 are mounted in the frame member 37 and extend toward the frame member 36; these pins maintain the rack 63 in engagement with the driving and driven gears 57 and 62 respectively.

As noted hereinabove, the sealing jaw member 39 is mounted between the cantilever arms 36 and 37 in fixed position, as by a plurality of bolts 65 or the like. The fixed jaw member is drilled to receive a pair of guide pins 66 and 67 (see Fig. 14). As indicated in Fig. 8, the guide pin 66 is engaged, along part of its length, by the walls of an aperture that is only slightly larger than the pin. At the end of the sealing jaw 39 facing the movable jaw 38, however, the guide pin aperture 68 is enlarged to receive one end of a spring 69. The spring 69 extends into a similar enlarged aperture 71 in the movable jaw 38. The end of the pin 66 opposite the fixed jaw member 39 is threaded into a suitable tapped opening in the jaw member 38, the extreme end of the pin being engaged in an aperture 71 in an adjusting spacer bar 72. The exterior surface of the spacer bar 72, opposite the pin 66, is engaged by the cam roller 61. As shown in Fig. 14, the spacer bar 72 is approximately equal in length to the roller 61. Moreover, the mounting for the guide pin 67 is the same as for the guide pin 66. Accordingly, it is seen that the spacer bar is supported upon the two pins and may be adjusted, by threading the pins into the sealing jaw 38, to engage the spacer bar 72 with the cam roller 61 throughout their respective lengths.

As indicated hereinabove, the stapler head 45 is of conventional construction. It includes a drive member 73 having an extension portion 74 which is engaged by the stapler driving cam 58 (see Figs. 8 and 11). A biasing spring 75 maintains the drive member extension 74 in engagement with the cam 58 and also serves to return the stapler to its initial or unactuated position, as shown in Fig. 8, upon completion of a stapling operation.

The movable sealing jaw 38 is supported upon a pair of guide blocks 76 and 77 which are affixed to the two cantilever arms 36 and 37 respectively (see Fig. 14). The construction of the sealing surface 78 of the jaw, which constitutes one of the important features of the invention, is best shown in Figs. 6, 7, 9, 9A and 9B. The sealing surface 78 of the jaw member 38 is provided with a multiplicity of relatively small teeth or islands which project outwardly of the surface. As indicated in Figs. 9A and 9B, the sealing teeth or islands 79, appear, in cross section, as truncated triangles. Actually, each of teeth 79 in the illustrated arrangement comprises a frustum of a four sided pyramid. However, it is not essential that the teeth be of rectangular configuration as viewed from the face thereof. Instead, they may comprise elements of frusto-conical configuration or other similar shape. It is important, however, that the sides 81 of the teeth be sloped rather than vertical. In a preferred form of sealing jaw, which includes five and one-half longitudinal rows of the sealing teeth 79, the overall height H of the teeth is made approximately one thirty-second inch. The width W of each tooth, at its face, is made approximately three sixty-fourths inch. Moreover, the center-to-center spacing S between teeth is made approximately three thirty-seconds inch and the base separation B between teeth is preferably of the order of one sixty-fourth inch. This particular pattern has been found to be highly effective in the invention, and represents a preferred form of sealing jaw, although it is subject to some variation as pointed out hereinafter.

The sealing surface 82 of the fixed jaw 39, on the other hand, is substantially different in configuration from the sealing surface 78 of the movable jaw 38. Thus, and as best seen in Figs. 6, 7 and 10, the surface 82 is provided with a plurality of longitudinal lands 83 which may be substantially rectangular in cross sectional configuration and which are separated from each other by a corresponding plurality of grooves 84. As more clearly shown in Figs. 6 and 7, there is no regular alignment between the sealing lands 83 on the jaw surface 82 and the sealing teeth or islands 79 on the movable jaw surface 78. Instead, in the illustrated arrangement, the number of sealing lands 83 is deliberately made different from the number of rows of sealing islands 79. In a typical and preferred construction, there are four sealing lands 83 as compared with the above noted five and one-half rows of sealing islands. Moreover, the spacing between the sealing lands is made substantially different from the spacing between the sealing islands, so that there are substantial variations in alignment between the sealing islands or teeth and the sealing lands. In a typical jaw, the height of the sealing lands may be of the order of one thirty-second inch, the width of the lands and the spacing between lands being of the order of one sixteenth inch.

Another important feature of the invention is incorporated in the construction of the stationary jaw 39 and is illustrated in Figs. 6 and 7. The upper portion of the jaw 39 includes a cam surface 85 which extends toward the movable jaw member 38 at an acute angle with respect to the perpendicular to the jaw surface 78. The angle of inclination may, for example, be of the order of seven degrees. This cam surface 85 terminates in a bearing member or lip 86 which engages the upper surface 87 of the jaw member 38. The cam surface 85 performs a definite and valuable function in the operation of the sealing machine as pointed out more fully hereinafter.

The mounting of the platform 23 which, as noted hereinabove, is vertically movable, is best illustrated in Figs. 4 and 8. As indicated therein, a vertical shaft 87 is mounted within the housing 22, being secured to a pair of bracket or shelf members 89 and 90 which preferably comprise an integral part of the machine housing. The rear portion of the shaft 87 is provided with a flat surface 88. The platform 23 is mounted on a bracket 94 which includes a boss 91 having a vertical bore therein through which the shaft 87 extends. The rear side of the boss is provided with a tapped opening for receiving the threaded end 92 of a platform locking handle 93. Thus, the locking handle 93 may be tightened within the tapped opening in the boss 91 to lock the bracket 94 and the platform 23 at any desired vertical location with respect to the base 21 of the machine.

Operation of the sealing and stapling machine 20, the construction of which is described in detail hereinabove, is exceedingly simple yet affords a highly effective and efficient sealing and stapling operation. At the outset, each of the cartons is passed through the heating block 28 as described hereinabove in connection with Figs. 1-3. The cross-sectional configuration of the closure portion 101 of a typical carton is illustrated in Figure 5. As indicated therein, one lip or end portion 102 of the carton is substantially longer than the mating lip or edge portion 103. The lip section 104 of the portion 102 is folded over the mating edge portion 103 of the carton. As the carton moves through the heating block 28, both portions 102 and 104 of the one layer of carton material are in contact with the heating block. Moreover, all three layers or sheets 102-104 are enclosed within the V-shaped notch 105 in the heating block, so that the wax or other heat softenable material with which the sheets are coated is thoroughly heated during the time that the carton is aligned with the heating block. After the closure portion of the carton 101 has been heated, it is moved, as described hereinabove, into the space 52 between the sealing jaws 38 and 39. At the time the carton enters the space 52, the sealing jaws are in the initial or unactuated position illustrated in Fig. 6 and also shown in Fig. 8. When the carton 101 first enters the space between the sealing jaws, it is not inserted completely therein. Instead, and as noted hereinabove, only the leading edge of the carton is inserted into the sealing station 35 of the machine in the initial sealing cycle for that carton. This condition is illustrated in Figs. 12 and 13, in which the length of the sealing station is indicated by the reference character L. In these figures, the initial sealing position of the closure portion 101 of the carton is indicated by the carton in position 101A.

On the next cycle of operation, the carton is moved to the center of the length L of the sealing and stapling station of the machine. This condition is shown in Figs. 12 and 13 by the closure portion of a carton in the position 101B. It is in this position that the carton is stapled. Moreover, the main sealing action of the machine takes place with the carton located in the central position 101B.

When the carton reaches the position 101B (Figs. 12 and 13), the mechanism of the sealing machine is in the position illustrated in Figs. 6 and 8, with the jaws 38 and 39 separated from each other by the maximum distance. The handle 46 is then moved in a clockwise direction, as seen in Fig. 8. This clockwise movement of the handle or operating lever 46 causes the gear 54 to rotate in a clockwise direction, and drives the meshing gear 55 (Fig. 11) in a counterclockwise direction. As a result, the shaft 56, the eccentric 58 and the gear 57 are all rotated in a counterclockwise direction as seen in Fig. 8. The counterclockwise rotation of the gear 57 drives the rack 63 to the left and causes the gear 62 to rotate in a counterclockwise direction. As a consequence, the shaft 59 and the eccentric of cam roller 61 mounted thereon are both driven to rotate in a counterclockwise direction.

As the operator continues the movement of the handle 46, the rotation of the cam roller 61 drives the spacer bar 72 to the left as seen in Fig. 8. This movement of the spacer bar impels the pins 66 and 67 in the same direction and drives the sealing jaw 38 toward the jaw 39. Accordingly, the three sheets or layers of carton material 102, 103 and 104 are compressed together. Ultimately, at the end of the movement of the handle 46, with the mechanism in the position of Fig. 11, the jaws 38 and 39 reach the position illustrated in Fig. 7, in which the carton layers 102-104 are tightly compressed upon each other. It is this compression of the three layers 102-104 which affords the major sealing action of the machine. Because the layers have previously been heated, they are effectively bonded together under pressure between the jaws 38 and 39 to form a liquid-tight seal.

As the jaw 38 moves toward the jaw 39, the fold portion 105 of the carton engages the cam surface 85 of the jaw member 39. The inclination of the cam surface 85 causes the extension or lip portion 104 of the carton to be drawn over the mating lip 103 with increasing tightness. That is, the cam surface 85 engages the fold edge 105 to fold the sheets 102, 104 more tightly over the sheet 103. In this manner, the seal between the upper extremity of the sheet 103 and the fold portion 105 is made substantially stronger than would otherwise be the case. This action of the cam surface 85 is of substantial importance in providing the substantially improved sealing characteristics achieved by the sealing and stapling machine 20.

The configuration of the sealing islands or teeth 79 and the irregular alignment thereof with respect to the sealing lands 83 is also important in regard to the character of the seal between the three layers 102-104. Because the lands and islands are substantially different in dimensions and configuration and vary to a considerable extent in alignment with respect to each other, no regular pattern is established in the seal between the three layers of carton material. Accordingly, the possibility of introduction of potential leakage paths into the seal is effectively minimized as compared with cartons sealed with conventional sealing jaws. Indeed, experience indicates that the possibility of such inherently weak potential leakage paths is virtually eliminated. In normal operation, the sealing machine 20 affords a closure which is stronger than the walls of the carton itself. Leakage, under even the most adverse conditions, occurs in no more than one to two percent of the sealed cartons.

Another important feature with regard to the quality of the seal is the sloping configuration of the walls of the sealing teeth or islands 79. During sealing, the wax or other heat softenable material on the carton is pressed into the spaces between these teeth. If the walls of the teeth are vertical, the wax or similar material flows unhampered into the space between the teeth and is compressed only in the ultimate stage of the sealing operation.

The sloping arrangement of the walls of these teeth, however, makes it possible for the jaw 38 to exert some compression on the wax throughout a susbtantial portion of the sealing operation. Moreover, the height H of the teeth should be controlled closely in order to prevent production of faulty seals. If the height H is made too large, an excess of the wax or other coating is driven into the space between the teeth, with the result that the paper or other base material for the carton may be bared or even ruptured. If the height is made too small, on the other hand, normal wear on the teeth may soon reduce their height to a point such that the jaw 38 might as well have a planar surface. In addition, it should be noted that enlargement of the space B between the teeth may leave excessive room for depositing of wax, so that insufficient wax remains on the surface of the carton layer engaged by the jaw 38.

Of course, the walls of the lands 83 might also well be inclined for the purpose set forth hereinabove in connection with the teeth 79. On the other hand, the sealing on this side of the carton is not as critical as on the other, since there is no direct outlet from the carton on this side. Consequently, the ribs or lands 83 may be of substantially rectangular cross sectional configuration.

During the sealing operation, as described hereinabove the rotation of the shaft 56 and the consequent rotation of the eccentric 58 forces the stapler drive members 73, 74 to the right from the position of Fig. 8 to that shown in Fig. 11. This movement of the stapler drive member actuates the stapler head 45 and drives a staple through the carton layers 102–104 and into engagement with the cam surfaces 97 and 98 of a stapler anvil 95 disposed in a slot 96 in the stapler jaw 38. The cam surfaces 97 and 98 deflect the ends of the staple inwardly, in conventional manner, to complete the stapling operation. Thus, a mechanical bond for the carton is provided by the staple 107, as illustrated in Fig. 7.

After the principal sealing and stapling operations have been completed, the handle 46 is returned to its initial position, returning the entire mechanism to the operating position illustrated in Fig. 8. Consequently, the jaws 38 and 39 are again separated, permitting movement of the carton to its third sealing position as described hereinabove in connection with Figs. 1–3 and as illustrated by carton position 101C in Figs. 12 and 13. The carton remains in this position during the next subsequent sealing operation. It is thus seen that the leading and trailing edges 108 and 109 of each carton are each compressed twice between the sealing jaws, thereby strengthening the seal in these critical portions of the closure for the carton.

Of course, and as pointed out previously, it is a simple matter to adjust the height of the platform bracket 94 so that the lever 20 may accommodate cartons of various sizes. Moreover, since the thickness of the carton material may vary to some extent, and because control of the sealing jaw pressure is important in controlling quality of the seal it is highly desirable that the limit of movement of the jaw 38 toward the jaw 39 be made adjustable. This is accomplished, in the present machine, by adjustment of the eccentric stop 48, which limits movement of the handle 46 and consequently is effective to limit the compression movement of the jaw 38 with respect to the jaw 39. For standard milk and beverage cartons, which normally have a thickness in the range of 0.025 to 0.05 inch, it is not usually necessary to adjust the stop 48 once it has been properly set for sealing a carton within this range.

The manually operated machine 20 provides for relatively rapid sealing of the cartons, yet is most inexpensive as compared with more conventional machines. Of course, the manual feeding and actuation of the machine could be made automatic by the provision of a device for feeding cartons through the machine and for actuating the main drive shaft 47. Whether manual or automatic operation is employed, it is preferred that all of the parts of the machine be fabricated from non-corrosive metals such as the alloy conventionally designated as "dairy nickel" or from stainless steel, including the frame and the various working parts of the machine, especially when the machine is employed in packaging beverages or other edibles.

Hence, while the preferred embodiments of the invention have been illustrated and described, it is to be understood that this is capable of variation and modification, and I therefore do not wish to be limited to the precise details set forth, but desire to avail myself of such changes and alterations as fall within the purview of the following claims.

I claim:

1. A sealing machine for wax coated milk and beverage cartons and the like comprising: a frame; an elongated carton-supporting platform, mounted on said frame; a heater block, mounted on said frame and disposed over a first portion of said platform, for heating the closure portion of a carton supported upon said first portion of said platform; a pair of sealing jaws, having opposed face surfaces, mounted on said frame for relative movement with respect to each other to compress the closure portion of a carton therebetween, said jaws being disposed over a second portion of said patform in alignment with said heater block; a cam member, affixed to one of said jaws and extending toward the other of said jaws at an acute angle with respect to the normal thereto, for engaging and folding the closure portion of a carton as said closure portion is compressed between said jaws; and means, mounted on said frame, for moving said jaws toward one another.

2. A manually operable sealing machine for wax coated milk and beverage cartons and the like comprising: a frame; an elongated carton-supporting platform, mounted on said frame for vertical adjustment with respect thereto to accommodate cartons of varying height; a heater block. mounted on said frame and disposed over a first portion of said platform, for heating the closure portion of a carton supported upon said first portion of said platform; a pair of sealing jaws, having opposed face surfaces, mounted on said frame for relative movement with respect to each other to compress the closure portion of a carton therebetween, said jaws being disposed over a second portion of said platform in alignment with said heater block, one of said face surfaces having a plurality of lands and grooves therein and the other of said face surfaces having a plurality of sloping-side sealing islands projecting outwardly thereof toward said one surface in varying alignment with said lands and grooves to prevent introduction of potential leakage paths into the sealed carton closure; a cam member, affixed to one of said jaws and extending toward the other of said jaws at an acute angle with respect to the normal thereto, for engaging and folding the closure portion of a carton as said closure portion is compressed between said jaws; and means, mounted on said frame, for manually moving said jaws toward one another.

3. A manually operable sealng machine for wax coated milk and beverage cartons and the like comprising: a frame; an elongated carton-supporting platform, mounted on said frame for vertical adjustment with respect thereto to accommodate cartons of varying height; a heater block, mounted on said frame and disposed over a first portion of said platform, for heating the closure portion of a carton supported upon said first portion of said platform; a pair of sealing jaws, having opposed face surfaces, a first one of said jaws being fixedly mounted on said frame and the other of said jaws being movably mounted on said frame for relative movement with respect to said one jaw to compress the closure portion of a carton therebetween, said jaws being disposed over a second portion of said platform in alignment with said heater block; a cam member, affixed to said first one of said jaws and extending toward the other of said jaws at an acute angle with respect to the normal thereto, for engaging and folding the closure portion of a carton as said closure portion is compressed between said jaws; and means, mounted on said frame, for moving said jaws toward one another in response to manual actuation.

4. A sealing machine for wax coated milk and beverage cartons and the like comprising: a frame; an elongated carton supporting platform, mounted on said frame; a heater block, mounted on said frame and disposed over a first portion of said platform, for heating the closure portion of a carton supported upon said first portion of said platform; a pair of sealing jaws, having opposed face surfaces, mounted on said frame for relative movement with respect to each other to compress the closure portion of a carton therebetween, said jaws being disposed over a second portion of said platform in alignment with said heater block; a cam member, affixed to one of said jaws and extending toward the other of said jaws at an acute angle with respect to the normal thereto, for engaging and folding the closure portion of a carton as said closure portion is compressed between said jaws; a stapler, mounted on said frame and having a staple-driving member extending through a first one of said jaws; a stapling anvil, mounted on the second one of said jaws in alignment with said staple-driving member; and means, mounted on said frame, for moving said jaws toward one another and for actuating said stapler as said jaws approach each other.

5. A manually operable sealing machine for wax coated milk and beverage cartons and the like comprising; a frame; an elongated carton-supporting platform, mounted on said frame for vertical adjustment with respect thereto to accommodate cartons of varying height; a heater block, mounted on said frame and disposed over a first portion of said platform, for heating the closure portion of a carton supported upon a first portion of said platform; a pair of sealing jaws, having opposed face surfaces, mounted on said frame for relative movement with respect to each other to compress the closure portion of a carton therebetween, said jaws being disposed over a second portion of said platform in alignment with said heater block, one of said face surfaces having a series of lands and grooves therein and the other surface having a plurality of frusto-pyramidal islands projecting outwardly thereof, the distribution of said islands and said lands being substantially different from each other to provide substantial differences in alignment therebetween and prevent the introduction of potential leakage paths into a sealed closure; and means, mounted on said frame, for moving said jaws toward one another.

6. In a sealing machine of the kind in which plural layers of material having a heat softenable external surface are sealed together under heat and pressure, a pair of sealing jaws, having opposed face surfaces, mounted for relative movement with respect to each other to compress said layers of material together between said face surfaces, one of said face surfaces having a plurality of lands and grooves and the other of said face surfaces having a plurality of relatively small closely-spaced sealing teeth projecting therefrom, said lands and said teeth each having a height of approximately $\frac{1}{32}$ inch, with the walls of said teeth sloping at an angle of the order of 30° with respect to the normal to said second face surface distribution of said islands and said lands being substantially different from each other to provide substantial differences in alignment therebetween.

7. In a sealing machine of the kind in which plural layers of material having a heat softenable external surface are sealed together under heat and pressure, a pair of sealing jaws, having opposed face surfaces, mounted for relative movement with respect to each other to compress said layers of material together between said face surfaces, and seal said layers together one of said face surfaces having a plurality of lands and grooves therein and the other of said face surfaces having a plurality of relatively small sealing teeth of substantially frusto-triangular cross sectional configuration projecting therefrom, distribution of said islands and said lands being substantially different from each other to provide substantial differences in alignment therebetween and prevent introduction of potential leakage paths into the completed seal.

8. In a sealing machine of the kind in which plural layers of material having a heat softenable external surface are sealed together under heat and pressure, a pair of sealing jaws, having opposed face surfaces, mounted for relative movement with respect to each other to compress said layers of material together between said face surfaces and seal said layers to each other, one of said face surfaces having a plurality of longitudinal lands and grooves therein and the other of said face surfaces having a plurality of relatively small sealing teeth of substantially truncated triangular cross-sectional configuration projecting therefrom, said teeth being arranged in a pattern of longitudinal rows with the spacing between adjacent rows different from the spacing between lands on said one surface to preclude consistent alignment between said rows and said lands, and to prevent introduction of potential leakage paths into the seal between said layers.

9. In a sealing machine for sealing together a first sheet of material and a second sheet of material folded over one edge of said first sheet, a pair of sealing jaws having opposed face surfaces, means mounting said jaws for relative movement with respect to each other to compress said sheets between said face surfaces, and a cam member, affixed to one of said jaws and extending toward the other of said jaws at an acute angle with respect to the normal thereto, for engaging the fold edge of said second sheet to fold said second sheet tightly over said first sheet as said jaws are moved toward each other.

10. In a sealing machine for sealing together a first sheet of material and a second sheet of material folded over one edge of said first sheet, a pair of sealing jaws having opposed face surfaces, means mounting said jaws for relative movement with respect to each other to compress said sheets between said face surfaces, and a cam member, affixed to one of said jaws and extending toward the other of said jaws at an upwardly inclined angle of approximately 7° with respect to the normal thereto, for engaging the fold edge of said second sheet to fold said second sheet tightly over said first sheet.

11. In a sealing machine for sealing together a first sheet of material and a second sheet of material folded over one edge of said first sheet, a pair of sealing jaws having opposed face surfaces, means mounting said jaws for relative movement with respect to each other to compress said sheets between said face surfaces, one of said face surfaces having a plurality of lands and grooves therein and the other of said face surfaces having a plurality of small closely-spaced sealing teeth projecting therefrom, said teeth being of substantially truncated triangular configuration in cross section; and a cam member, affixed to one of said jaws and extending toward the other of said jaws at an acute angle with respect to the normal thereto, for engaging the fold edge of said second sheet to fold said second sheet tightly over said first sheet.

References Cited in the file of this patent

UNITED STATES PATENTS

| | | |
|---|---|---|
| 1,948,570 | Ferenci | Feb. 27, 1934 |
| 2,119,358 | Scharf | May 31, 1938 |
| 2,356,472 | Rothaug | Aug. 22, 1944 |
| 2,496,609 | Antwerpen | Feb. 7, 1950 |
| 2,583,106 | Kayat | Jan. 22, 1952 |
| 2,750,721 | Earp et al. | June 19, 1956 |
| 2,841,936 | Mojonnier | July 8, 1958 |
| 2,875,070 | Rockland et al. | Feb. 24, 1959 |

OTHER REFERENCES

Doughboy Sealers and Conveyor Tables, December 1943 (pp. 10 and 11).